United States Patent

[11] 3,633,963

| [72] | Inventor | Charles K. Haynes |
| | | P.O. Box 176, Canton, Ga. 30114 |
| [21] | Appl. No. | 53,253 |
| [22] | Filed | July 8, 1970 |
| [45] | Patented | Jan. 11, 1972 |

[54] PULLET TRAILER
13 Claims, 6 Drawing Figs.

[52] U.S. Cl. .................................................. 296/24 C,
 119/12
[51] Int. Cl. ...................................................... B60r 7/00
[50] Field of Search ......................................... 296/24 C,
 3, 12; 119/9, 11, 12, 97; 312/290

[56] References Cited
UNITED STATES PATENTS

| 172,714 | 7/1954 | Gray ............................. | 296/24.3 |
| 2,896,996 | 7/1959 | Atwater ....................... | 296/3 |

FOREIGN PATENTS

| 247,961 | 4/1947 | Switzerland ................. | 296/3 |

Primary Examiner—Philip Goodman
Attorneys—Clarence A. O'Brien and Harvey B. Jacobson ABSTRACT: A vehicle body including opposite side and end walls and an upstanding center longitudinal partition dividing the interior of the body into opposite side longitudinal compartments. The body further includes a lower bottom wall extending between the lower marginal edge portions of the opposite side and end walls as well as the upstanding center longitudinal partition and also openable top wall panels removably closing the upper ends of the side compartments. Each of the side compartments includes vertically spaced removable longitudinal flooring sections dividing each of the side compartments into vertically spaced individual compartment flights extending longitudinally of the body. One end wall includes openable closure doors with which the corresponding ends of the compartment flights are registered and the flooring sections are each longitudinally shiftable outwardly through the corresponding closure doors for removal from the body. Still further, the sidewalls each includes access door-defining portions registered with longitudinally spaced portions of each of the corresponding compartment flights and the lower side marginal edge portions of the body include longitudinally extending generally horizontal step portions upon which workmen loading and unloading the vehicle body may stand.

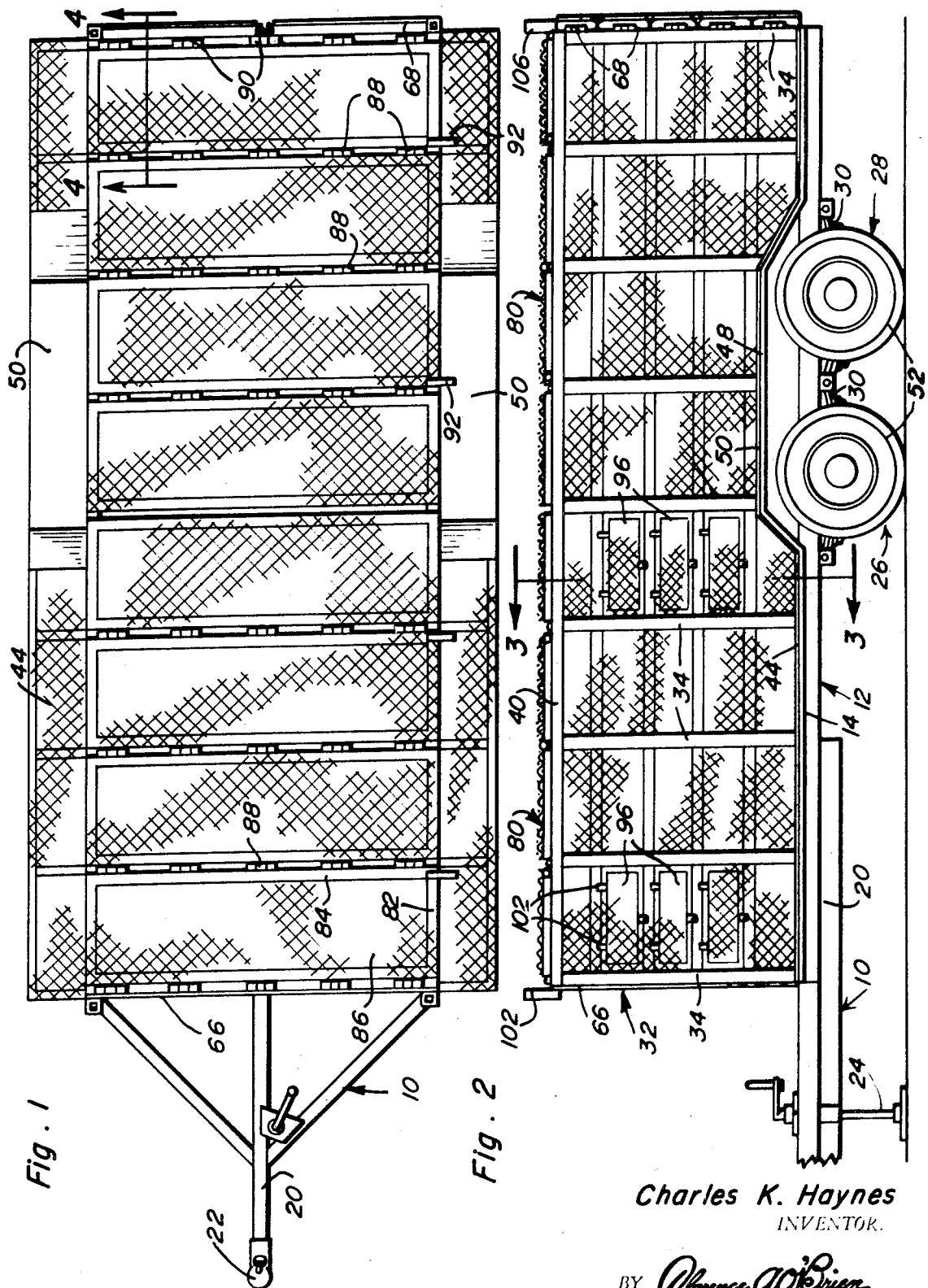

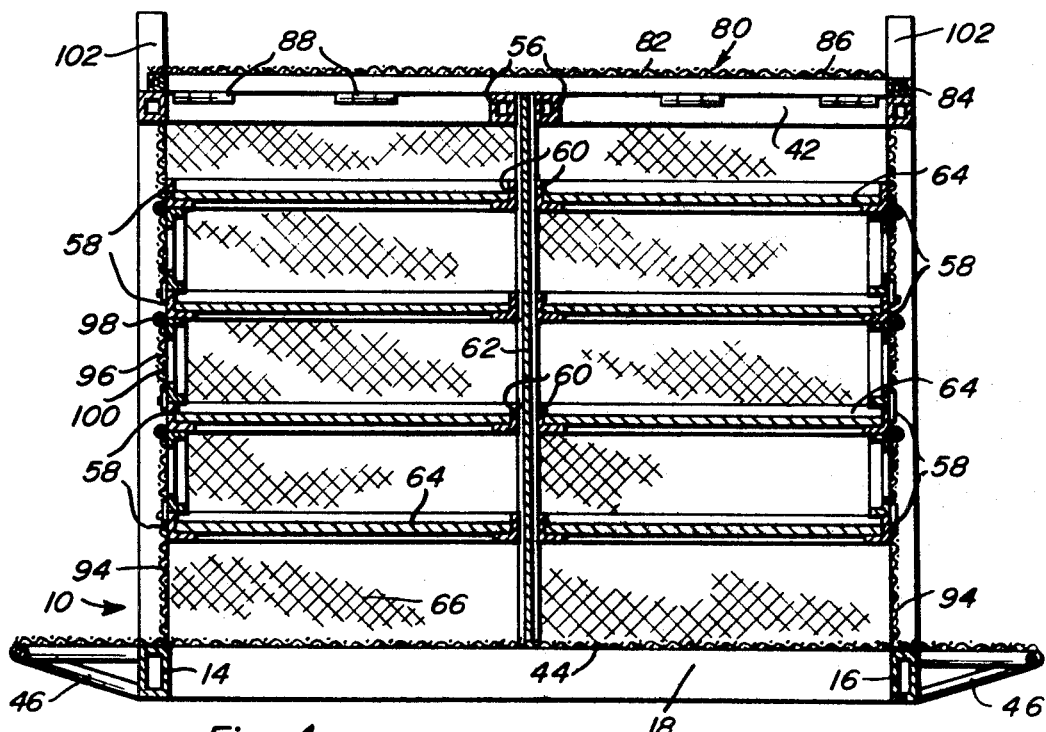
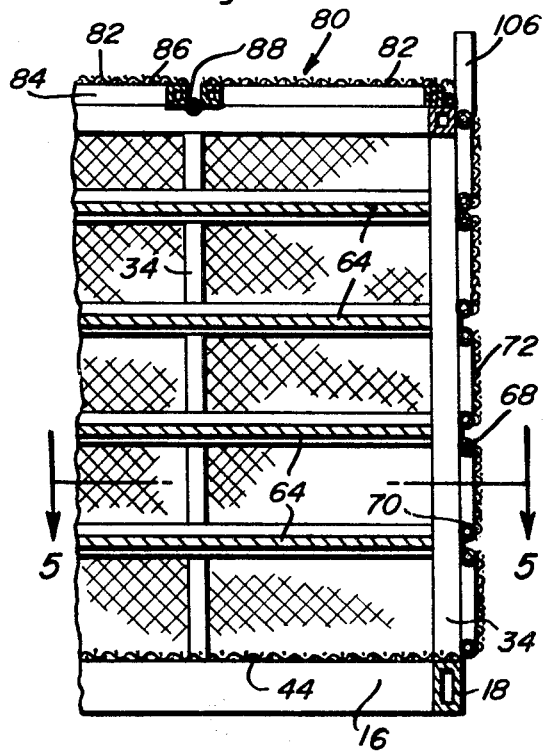
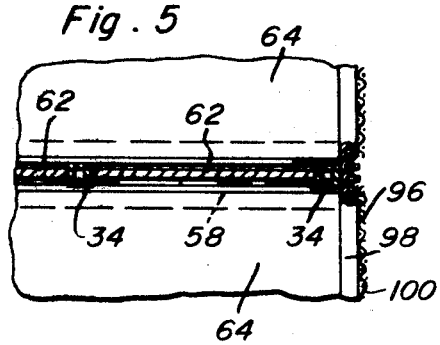

PULLET TRAILER

The vehicle body of the instant invention is adapted to be supported from a wheeled vehicle chassis and has been specifically designed to carry chickens or other fowl.

The body is designed to be loaded from above through bifold doors which close the upper ends of the opposite side longitudinal compartments of the body and the fowl carried within the body are removed through the rear doors thereof closing the rear ends of the individual vertically spaced opposite side compartment flights defined between and above the vertically spaced flooring sections removably supported in each of the opposite side compartments defined by the upstanding center partition of the body. In this manner, fowl such as chickens may be readily loaded into the lowest compartment flight of the body after which the flooring sections of the next upper compartment flights may be installed before those flights are loaded with chickens, etc.

Further, by discharging the chickens from the rear ends of the various compartment flights, the chickens may be driven through the rear ends of the compartment flights in a reasonably controlled manner and accordingly the loading and unloading of chickens or other fowl may be accomplished with substantially all injury to the fowl being eliminated.

The various wall sections and doors of the body are defined by expanded metal sections and therefore adequate ventilation is provided for the fowl carried in the vehicle body. In addition, the upstanding center longitudinal partition of the body comprises a plurality of longitudinally spaced and aligned partition sections which may be upwardly removed from within the vehicle body when desired. Further, by rendering the vertically spaced longitudinal flooring sections of the various compartment flights removable through the rear end of the vehicle body, the flooring sections may be readily cleaned after each usage and ready access may be thereafter gained to the interior of the vehicle body for spray or other cleaning of the various expanded metal wall panels thereof.

Although the vehicle body of the instant invention is specifically described and illustrated hereinafter as being mounted upon a wheeled trailer chassis, it is to be noted that the vehicle body could be mounted directly upon a wheeled vehicle chassis of the power type. Further, the body assembly could also be constructed in the form of an integral container to be loaded onto and unloaded from various types of vehicles such as trucks, trailers, trains and water vehicles, etc.

The main object of this invention is to provide a vehicle body assembly which will be capable of enclosing a large number of chicken or other fowl and which may be readily loaded with fowl and have fowl unloaded therefrom with little injury, if any, being incurred by the fowl.

Another object of this invention, in accordance with the immediately preceding object, is to provide a vehicle body constructed in a manner whereby the chicken or fowl to be transported therein may be readily and quickly loaded thereinto and also quickly and orderly discharged therefrom.

Yet another object of this invention is to provide a body for transporting chicken or other fowl and constructed in a manner whereby the various components of the body subject to contact by the chickens may be readily cleaned.

Still another object of this invention is to provide a vehicle body in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the vehicle body mounted upon a trailer chassis;

FIG. 2 is a fragmentary elevational view of the embodiment illustrated in FIG. 1;

FIG. 3 is an enlarged fragmentary transverse vertical sectional view taken substantially upon the plane indicated by the section line 3—3 of FIG. 2;

FIG. 4 is a fragmentary longitudinal vertical sectional view taken substantially upon the plane indicated by the section line 4—4 of FIG. 1;

Figure 6:
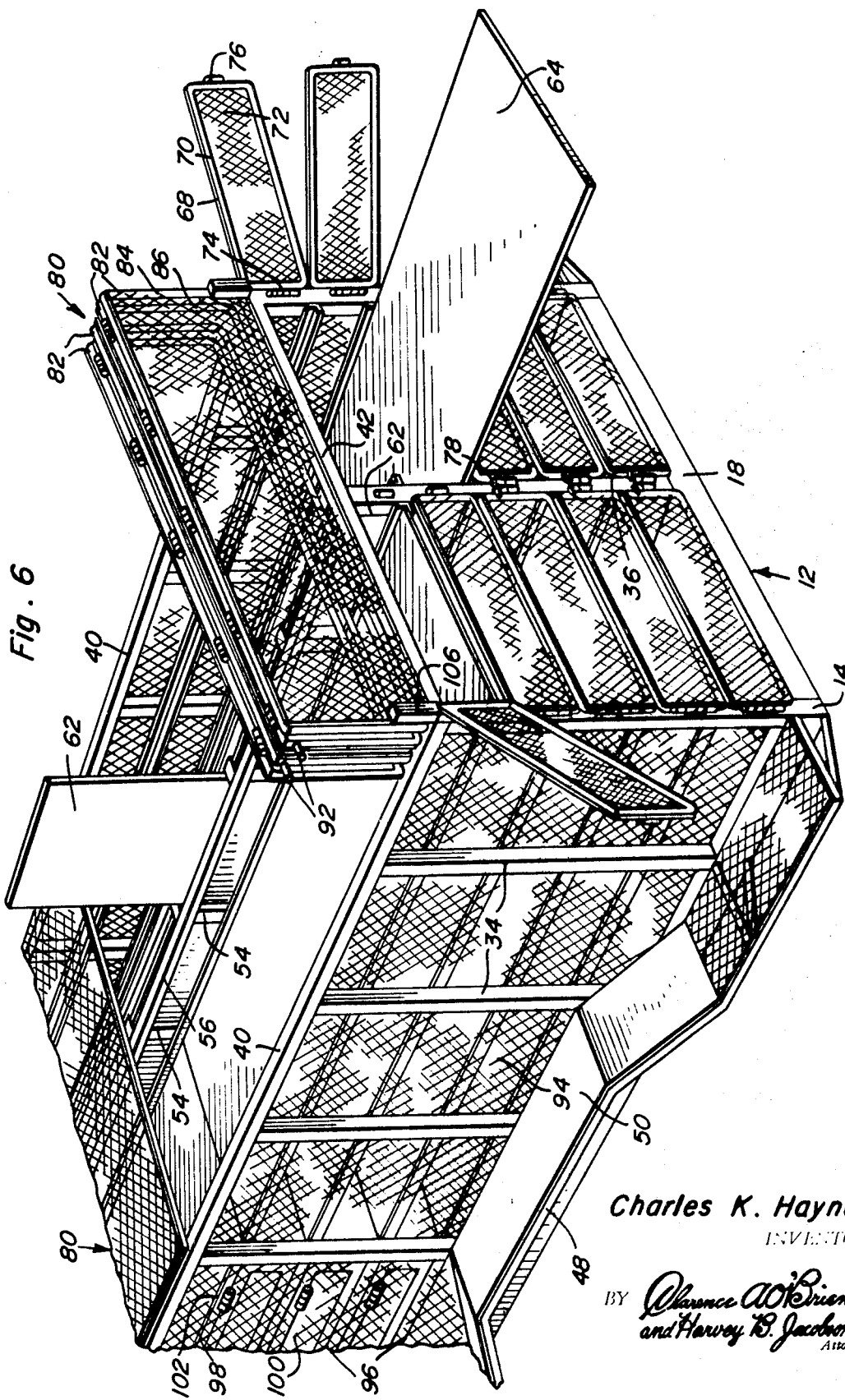

FIG. 5 is a fragmentary horizontal sectional view taken substantially upon the plane indicated by the section line 5—5 of FIG. 4; and FIG. 6 is a fragmentary perspective view of the vehicle body with certain of the rear doors thereof in open position, one of the flooring sections partially displaced rearwardly, one of the center partition panels partially displaced upwardly and one-half of the upper bifold doors moved to the open positions thereof.

Referring now more specifically to the drawings, the numeral 10 generally designates a trailer including a main frame referred to in general by the reference numeral 12. The frame 12 includes opposite side longitudinal members 14 and 16 interconnected by means of longitudinally spaced and transversely extending transverse members 18. The forward end of the frame 12 includes a forwardly projecting center towing tongue 20 including a socket hitch 22 at its forward end and a vertically adjustable support standard 24 intermediate its opposite ends. In addition, the frame includes tandem axle assemblies referred to in general by the reference numerals 26 and 28 and each axle assembly 26 and 28 is secured to the longitudinal frame members 16 by means of conventional leaf springs 30.

A body assembly referred to in general by the reference numeral 32 is supported from the frame 12 and includes longitudinally spaced upstanding opposite side standards 34 and opposite end upstanding center standards 36. The lower ends of the standards 34 are supported from the longitudinal members 14 and 16 and the lower ends of the center standards 36 are supported from the front and rear transverse members 18.

The upper ends of the standards 34 and 36 are interconnected by means of the longitudinally extending opposite side upper members 40 and transversely extending opposite end upper members 42. Thus, a rectangular framework open at its upper and lower ends is provided. However, a lower expanded metal flooring 44 extends between the longitudinal members 14 and 16 and the opposite end members 18 and also projects outwardly of the longitudinal members 14 and 16. Portions of the flooring 44 projecting outwardly of the longitudinal members 14 and 16 are suitably braced by opposite side longitudinally extending cantilever brace assemblies 46 and the brace assemblies 46 each includes central portions 48 thereof which are upwardly displaced and covered by means of solid panel sections 50 defining fenders overlying the wheels 52 of the axle assemblies 26 and 28.

The body assembly 32 additionally includes further longitudinally spaced upstanding center standards 54 whose lower ends are supported from the various transverse members 18 spaced intermediate the opposite end members 18 and a pair of opposite side upper central longitudinal members 56 extend between the front and rear upper members 42 and are secured to opposite sides of the latter as well as the standards 54.

Each side of the body assembly 32 includes four vertically spaced longitudinally extending angle brackets 58 secured to the inner surfaces of the standards 34 and four similar vertically spaced angle brackets 60 are secured to each set of corresponding sides of the standards 36 and 54.

A plurality of partition panels 62 are downwardly slidably received between adjacent standards 36 and 54 and the longitudinal members 56. Each of the partition panels or sections 62 extends from the flooring 44 to the upper edge portions of the longitudinal members 56 and may be slidably upwardly removed through the open top of the body assembly 32, see FIG. 6.

In addition to the removable panels or sections 62, the body assembly 32 includes opposite side sets of vertically spaced flooring sections 64 supported from each pair of corresponding angle members 58 and 60 and each flooring section 64 may be removed from the body assembly 32 through the rear end thereof, see FIG. 6.

A pair of opposite side longitudinal compartments are defined between the opposite side standards 34 and the standards 36 and 54 and each of the compartments is divided into vertically spaced longitudinally extending compartment flights by the flooring sections 64. Of course, the lower sides of the lowest compartment flights are closed by means of the expanded metal flooring 44, see FIG. 3.

The body section 32 includes an expanded metal front wall 66 extending between the front standards 34 and 36 and the rear end of each compartment flight is removably closed by means of a horizontally swingable door 68 comprising a frame 70 covered with an expanded metal panel 72. Each frame 70 is hingedly supported in horizontal registry with the rear end of the corresponding compartment flight from the corresponding rearmost standard 34 as at 74 and the free-swinging edge portion of each closure door 68 includes a keeper 76 with which a latch pin 78 may be removably operatively associated in any conventional manner to retain each of the closure doors 68 in the closed position.

The open upper portion of the body assembly 32 is removably closed by means of a pair of front and rear bifold door assemblies referred to in general by the reference numerals 80. Each bifold door assembly 80 includes four door sections 82 defined by a framework 84 covered with an expanded metal panel 86. The door sections 82 of each door assembly 80 are hingedly joined together along adjacent edge portions as at 88 and the front and rear edge portions of the forwardmost and rearmost door sections 82 are hingedly supported from the front and rear upper transverse members 42 as at 90. Still further, certain of the door sections 82 are provided with laterally outwardly projecting handles 92 whereby the door assemblies 80 may be readily swung from the closed positions thereof illustrated in FIG. 1 of the drawings to the open position of the rearmost door assembly illustrated in FIG. 6.

The opposite sides of the body assembly 32 are closed by means of expanded metal panel sections 94 extending between the standards 34 and certain portions of the expanded metal panels are left open in areas bounded by adjacent standards 34 and angle members 58 and these open areas of the expanded metal panel 94 are closed by means of vertically swingable doors 96 which each comprise a frame 98 covered by an expanded metal section or panel 100. Each of the doors 96 is hingedly supported from a corresponding angle member 58 as at 102 for vertical swinging between a vertically disposed closed position such as that illustrated in FIG. 4 of the drawings and a horizontally outwardly projecting open position.

The four upper corners of the body assembly 32 include stops 106 for support of the bifold door assemblies 80 in the open positions and it will be noted that when the door assemblies 80, the closure doors 68 and the access doors 96 are closed that a fully closed body assembly 32 is provided.

When it is desired to load the body assembly 32 with chicken or other fowl, the bifold door assemblies 80 are moved to the open positions thereof and the flooring sections 64 are removed. Further, if it is desired to divide each vertically spaced compartment of the body assembly 32 defined above and below the flooring sections 64 into opposite side compartment flights, the partition panels or sections 62 are downwardly inserted into the upwardly opening recesses defined therefor between the standards 36 and 54 and the upper opposite side center longitudinal members 56. Thereafter, chicken or other fowl may be downwardly discharged into the two main opposite side compartments defined within the body assembly on opposite sides of the partition panels or sections 62. The chicken or fowl discharged into the body assembly 32 will of course be supported by the flooring section 44.

After a predetermined number or quantity of fowl is supported from the bottom wall 44, the lowermost opposite side flooring sections 64 may be slid into the rear end of the body assembly 32 after the appropriate closure doors 68 are opened. These flooring sections 64 will of course cover the chicken or other fowl supported from the flooring 44 and define second flooring sections upon which to receive the next predetermined number of fowl downwardly displaced into the body assembly 32. After the proper number of additional fowl have been placed within the body assembly 32 on the lowermost flooring sections 64, the next uppermost flooring sections 64 are inserted into the body assembly 32 through the rear end thereof and this process is repeated until the proper number of fowl has been placed upon each half of the flooring 44 and each of the flooring sections 64 after which the upper bifold door assemblies 80 are moved to the fully closed positions. Thereafter, the trailer 10 may be utilized to transport the chicken or fowl contained within the body assembly 32 to any desired location.

After arriving at their destination, the body assembly 32 may have successive pairs of corresponding opposite side closure doors 68 swung to the open positions. Then, the forward access doors 90 of the corresponding compartment flights may be opened so as to drive the chickens from the front end of the body assembly 32 outwardly of the rear end thereof.

When unloading the body assembly 32, the uppermost closure doors 68 are first opened and the chickens disposed on the uppermost flooring sections 64 may be driven out of the rear end of the body assembly by workmen provided with prod sticks or the like inserted into the upper portion of the body assembly through the bifold door assemblies 80 when the latter are partially opened. Then, after the uppermost compartment flights have been emptied of chicken or other fowl, the front uppermost access doors 96 may be opened in order to drive the chickens in the next lower compartment flights out of the rear end of the body assembly 32 as soon as the corresponding closure doors 68 have also been opened.

If it is desired to clean the body assembly 32, the bifold doors may be retained in the closed positions and the flooring sections 64 may be withdrawn through the rear end of the body assembly 32. Then, the flooring sections 64 may be readily and thoroughly cleaned in any convenient manner. In addition, the various remaining expanded metal panel sections of the body assembly 32 may be readily spray cleaned from both inside and outside of the body assembly 32.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle body including upstanding opposite side and end walls interconnected along their lower marginal edge portions by means of a bottom wall, said body including vertically spaced longitudinally extending generally horizontal flooring sections removably supported therefrom and the upper portion of said body being open for downwardly receiving articles to be carried in said body, whereby the lowest floor in said body may initially have articles to be carried disposed thereon and successive higher flooring sections of said body may be positioned therein and be successively loaded with further articles to be carried from above.

2. The combination of claim 1 wherein one of said end walls includes closure door sections thereof shiftable between open and closed positions opening and closing corresponding portions of said one end wall, said closure doors being horizontally registered with the rear ends of the compartment flights defined within said body above and below said flooring sections.

3. The combination of claim 2 wherein said flooring sections are each endwise shiftable through the corresponding portions of said one end wall closed by the corresponding closure doors.

4. The combination of claim 1 wherein said body includes upper horizontal doors shiftable between open and closed positions substantially fully opening and substantially fully closing, respectively, the upper side of said vehicle body.

5. The combination of claim 4 wherein one of said end walls includes closure door sections thereof shiftable between open and closed positions opening and closing corresponding portions of said one end wall, said closure doors being horizontally registered with the rear ends of the compartment flights defined within said body above and below said flooring sections.

6. The combination of claim 5 wherein said flooring sections are each endwise shiftable through the corresponding portions of said one end wall closed by the corresponding closure doors.

7. The combination of claim 1 wherein one of said end walls includes closure door sections thereof shiftable between open and closed positions opening and closing corresponding portions of said one end wall, said closure doors being horizontally registered with the rear ends of the compartment flights defined within said body above and below said flooring sections, said sidewalls including removably closeable access openings in the end portions thereof remote from said one end wall and horizontally registered with at least the forward end portions of some of said compartment flights.

8. The combination of claim 1 wherein one of said end walls includes closure door sections thereof shiftable between open and closed positions opening and closing corresponding portions of said one end wall, said closure doors being horizontally registered with the rear ends of the compartment flights defined within said body above and below said flooring sections, said body including central longitudinally spaced and aligned upstanding partition members removable upwardly through the upper side of said body, said removable flooring sections including vertically spaced pairs of horizontally aligned flooring sections with the sections of each pair of sections disposed on opposite sides of said partition members.

9. The combination of claim 8 wherein said body includes upper horizontal doors shiftable between open and closed positions substantially fully opening and substantially fully closing, respectively, the upper side of said vehicle body.

10. The combination of claim 1 wherein said body includes upper horizontal doors shiftable between open and closed positions substantially fully opening and substantially fully closing, respectively, the upper side of said vehicle body, said upper horizontal doors being arranged in a pair of opposite end bifold door assemblies disposed horizontally over the opposite end portions of said body and including adjacent free edge portions, said bifold door assemblies being foldable from the fully closed positions toward open positions positioned at the opposite ends of said body.

11. The combination of claim 1 wherein one of said end walls includes closure door sections thereof shiftable between open and closed positions opening and closing corresponding portions of said one end wall, said closure doors being horizontally registered with the rear ends of the compartment flights defined within said body above and below said flooring sections, said side walls including removably closable access openings in the end portions thereof remote from said one end wall and horizontally registered with at least the forward end portions of some of said compartment flights, said body including longitudinally extending opposite side and horizontally outwardly projecting walkway sections extending along the lower marginal edge portions of the sidewalls of said body.

12. The combination of claim 11 wherein said body comprises a vehicle body provided with rear wheels disposed outwardly of the sidewalls of said body and projecting at least slightly above said bottom wall, said walkway sections including upwardly displaced portions extending over said wheels and defining fenders therefor.

13. The combination of claim 1, wherein said side, end and bottom walls are constructed of expanded sheet metal sections.

* * * * *